United States Patent [19]

van der Schoot

[11] Patent Number: 5,931,088
[45] Date of Patent: Aug. 3, 1999

[54] BULBOUS OR TUBEROUS CROP SURFACE TREATING APPARATUS

[75] Inventor: Peter Willem Carolus van der Schoot, AG Groot Ammers, Netherlands

[73] Assignee: Goudsche Maschinefabriek B.V., PD Waddinxveen, Netherlands

[21] Appl. No.: 08/946,280

[22] Filed: Oct. 7, 1997

[30] Foreign Application Priority Data

Oct. 8, 1996 [NL] Netherlands ............................ 1004226

[51] Int. Cl.$^6$ .............................. A23N 7/00; A23N 7/02
[52] U.S. Cl. ............................................... 99/625; 99/626
[58] Field of Search ................... 99/584, 586, 616–618, 99/620, 622–630; 15/3.16–3.18; 426/481–483

[56] References Cited

U.S. PATENT DOCUMENTS

| | | | |
|---|---|---|---|
| 4,237,782 | 12/1980 | Bichel | 99/625 |
| 4,242,952 | 1/1981 | Van Der Schoot | 99/626 X |
| 4,519,305 | 5/1985 | Vanosdall | 99/629 X |
| 4,990,353 | 2/1991 | Van Der Schoot | 426/483 |

FOREIGN PATENT DOCUMENTS 2298966  8/1976  France .

OTHER PUBLICATIONS

Voedingsmiddelentechnologie, 22, No. 9, Apr. 27, 1989, Zeist.

*Primary Examiner*—Timothy F. Simone
*Attorney, Agent, or Firm*—Sprung Kramer Schaefer & Briscoe

[57] ABSTRACT

Apparatus for treating the surface of bulbous or tuberous crops, comprising a substantially tubular treatment channel inclining upwards in the main direction of transport and comprising a top wall and a bottom wall, the bottom wall being made up of a number of drivable parallel rollers provided with treatment elements, and the top wall consisting of the lower part of a drivable endless conveyor. For the purpose of modifying the channel height, the top wall and the bottom wall are movable relative to each other longitudinally as well as perpendicularly. The lowermost rollers can form a receptacle reaching as far as before the foremost point of the conveyor belt.

8 Claims, 1 Drawing Sheet

BULBOUS OR TUBEROUS CROP SURFACE TREATING APPARATUS

BACKGROUND OF THE INVENTION

This invention relates to an apparatus for treating the surface of bulbous or tuberous crops, which apparatus comprises a substantially tubular treatment channel inclining upwards in the main direction of transport and comprising a top wall and a bottom wall, the bottom wall being made up of a number of drivable rollers arranged at slight mutual interspaces, parallel to each other and transversely to the main direction of transport and provided at their circumference with treatment means, such as brushes or profiles, and the top wall consisting of the lower part of a drivable endless conveyor belt traveling around return pulleys, while the top wall and the bottom wall are movable relative to each other to enable modification of the internal height of the treatment channel.

Such an apparatus is known from NL-C-166386 in applicant's name. There the rotary rollers take care of the transport of the products to be treated, while the conveyor belt is preferably driven opposite to the main direction of transport, which provides the possibility of optimum setting of the residence time of the products to be treated in the apparatus. In particular as a peel removing apparatus of steam-pretreated tuberous crops, this known apparatus has proved its utility over the years. The internal height of the treatment channel of the apparatus is adjusted to the products to be treated; a relatively great height for, for instance, kohlrabi and celeriac, and a relatively small height for, for instance, small potatoes and carrots. Here, in particular in the processing of relatively small products, problems can arise in that those products may not end up properly between the belt top wall and the roller bottom wall, resulting in jamming at the inlet of the treatment channel.

SUMMARY OF THE INVENTION

The object of the invention is to improve the operation of the treatment apparatus described in the opening paragraph hereof.

This object is achieved, in accordance with the invention, if the top wall and the bottom wall are further movable relative to each other in the longitudinal direction of the channel in such a manner that when increasing the height of the treatment channel the top wall is movable relative to the bottom wall in the main direction of transport, and vice versa. Experiments have shown that taking these measures, and thereby adjusting the inlet to the modified height of the treatment channel, i.e., setting, at a smaller channel height, a correspondingly narrower inlet, and vice versa, promotes the products ending up in the channel in the proper manner, and thereby prevents jamming.

Adjusting the inlet to a modified channel height can be realized simply and fast if, in accordance with a further embodiment of the invention, a displacement for the purpose of modifying the internal height of the treatment channel is automatically accompanied by a displacement of the walls relative to each other in the longitudinal direction. Constructionally, it is then preferred that the bottom wall is arranged stationarily and the top wall is provided with an adjusting mechanism effecting a simultaneous displacement of the top wall in the longitudinal and height direction of the treatment channel, and in accordance with a further embodiment of the invention this adjusting mechanism can be advantageously realized if the adjusting mechanism is provided with jacking means arranged at an angle with the main direction of transport, this angle obviously being chosen such that inlet and channel height change proportionally in the same manner upon setting the adjusting mechanism into operation.

In particular in the processing of relatively small products, a trouble-free operation of the apparatus can be further promoted if, in addition to optimization of the dimensions of the treatment channel with its inlet, the configuration of that inlet is such that the formation of dead corners is prevented. For that reason, it is preferred, in accordance with a further preferred embodiment of the invention, that the first roller has its centerline so arranged as to be situated before the foremost point of the conveyor belt forming the top wall, while at least a portion of the upper part adjacent the lower return pulley forms a first wall of a feed channel and an oppositely located second wall of the feed channel connects to that first roller at a steep angle with the horizontal. What is accomplished by these measures is that all the products ending up at the inlet via the feed channel fall onto a roller, either directly or via the steep wall by gravity, so that it is ensured that all the products that fall down along the conveyor belt driven in opposite direction come into contact with the roller's upper side rotating in the main direction of transport and thus cannot lag in or at the inlet thereby possibly causing jamming by arching.

To promote the desired effect still further, it can be provided, in accordance with a further embodiment of the invention, that the bottom wall is substantially formed by rollers whose centerlines lie in one common plane, while the centerline of at least the first roller lies above that common plane in the direction of the top wall, the arrangement being such that the first portion of the bottom wall has a configuration in the form of a receptacle. This is simple to realize if the centerlines of the first two rollers lie above the common plane, and the centerline of the first roller lies further away from that common plane than does the centerline of the second roller. Here the initial lowermost portion of the bottom wall of the treatment channel can be designed to correspond to the top wall if, in accordance with a further embodiment, the centerline of the second roller lies under a plane defined by the centerline of the first and of the third roller.

Referring to an exemplary embodiment schematically shown in the single figure of the drawing, the treatment apparatus according to the invention will presently be further discussed and elucidated.

BRIEF DESCRIPTION OF THE DRAWINGS

The FIGURE is a schematic view of the apparatus for treating the surface of bulbous or tuberous crops according to the invention.

DETAILED DESCRIPTION OF THE INVENTION

Figure 1:
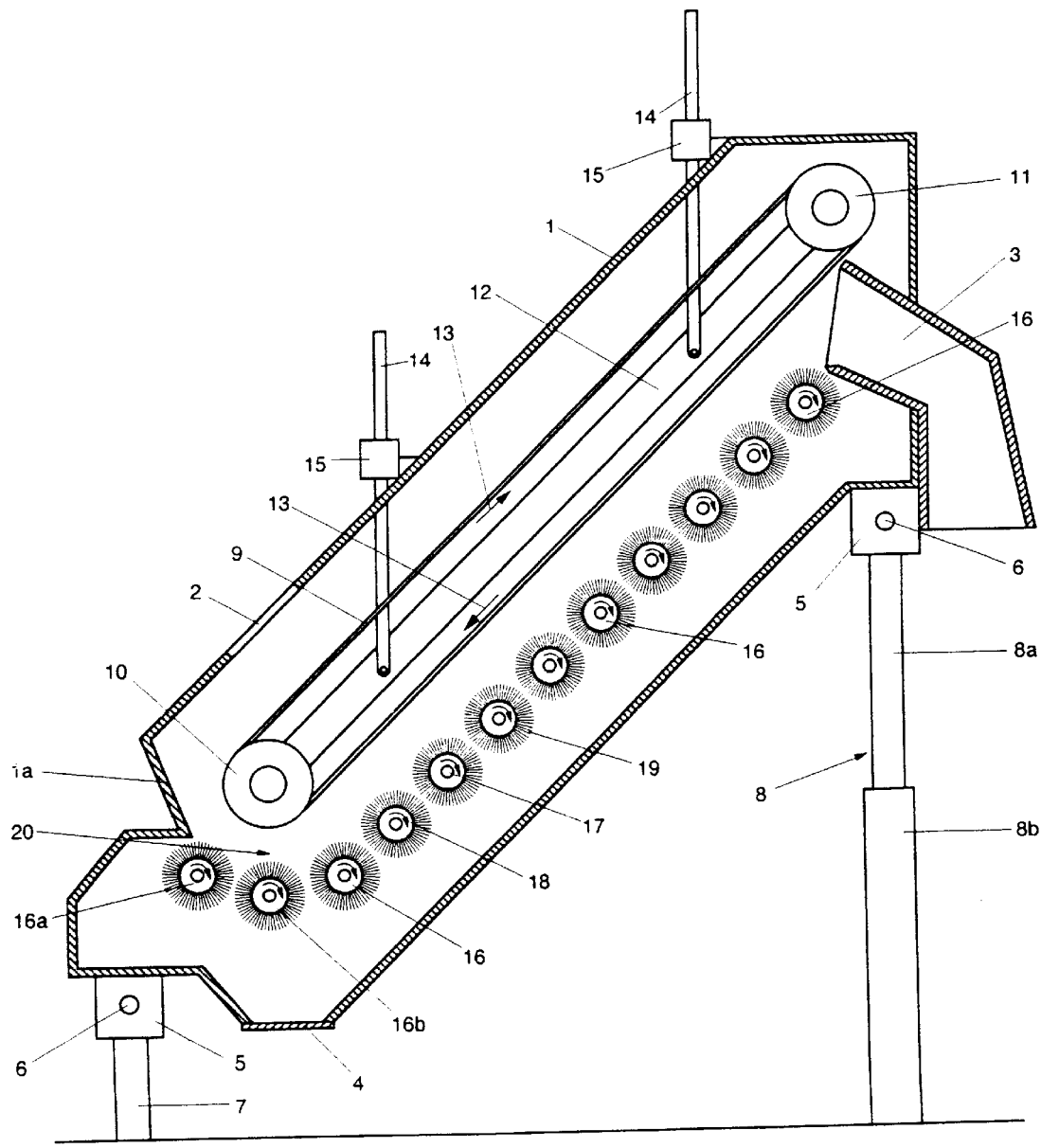

The treatment apparatus represented in the drawing comprises a substantially closed, diagrammatically represented housing 1 with a supply opening 2, a chute 3, and a waste discharge closed by a lid 4. The housing 1 further comprises two ears 5 which are connected via pins 6 with a short upright 7 and a long upright 8 made up of telescopic parts 8*a* and 8*b*.

Arranged at an inclination within the housing 1 is a conveyor belt 9 traveling around a set of return pulleys 10, 11 rotatably mounted on a frame 12. The conveyor belt 9 is movable in the direction of arrow 13 by driving means (not shown), whereby, accordingly, the lower part travels downwards and the upper part travels upwards. The frame 12 is suspended from spindles 14 of jacking means 15, which are secured to the housing 1, so that the frame 12 is movable via the spindles 14 within the housing 1. Further, in the housing 1 a number of rollers 16 are rotatably mounted, each roller 16 being drivable about its axis 17 in the direction of arrow 18 by driving means, not shown. Further, each roller is set with bristles 19 throughout its circumference. The rollers 16 are so arranged that their centerlines all lie in the same plane, which plane extends parallel to the lower part of the conveyor belt 9. Further, two similar rollers 16a and 16b are mounted in the housing 1 for driven rotation, whose centerlines lie above the plane in which lie the centerlines of the other rollers 16, while the centerline of roller 16a is situated in vertical direction above the centerline of the roller 16b and is situated at the same horizontal level as the centerline of the lowermost roller 16. Thus this lowermost roller 16 together with the rollers 16a and 16b forms a kind of receptacle 20 under the return pulley 10, with the front end of that receptacle 20 being situated at some distance before the foremost point of the return pulley 10. The receptacle 20 formed by the rollers finds its continuation in a steeply inclined housing portion 1a contiguous to the roller 16a. Thus a treatment channel is obtained with an inlet between the return pulley 10 and the housing part 1a and which is further bounded by substantially the lower part of the conveyor belt 9 and the rollers 16a, 16b and 16, which treatment channel ends at the chute 3.

Depending on the size of the products to be treated, the height of the treatment channel can be set with the aid of the jacking means 14. If small products are to be treated, the channel height is reduced by lowering the frame 12 via the spindles 14. Because the spindles 14 include an angle deviating from 90°, in the exemplary embodiment 45°, both with the upper and lower part of the conveyor belt 9 and with the plane in which lie the centerlines of the rollers 16, upon lowering of the frame 12, not only the distance between the rollers 16 and the lower part of the conveyor belt 9 will decrease, but so will, proportionally, the distance between the return pulley 10 and the rollers 16a and 16b, so that the height of the treatment channel in the receptacle 20 and at the inlet adjacent the housing portion 1a is reduced simultaneously with the channel height above the rollers 16.

The operation of the treatment apparatus is as follows. The products to be treated are introduced into the housing 1 via the supply opening 2 and fall down, whereby the products either fall directly onto the roller 16a or end up on the roller 16a via the steeply inclined housing portion 1a, and are further transported by the roller 16b and the rollers 16 to the chute 3.

The desired treatment of the products then takes place by the contact with the bristles 19 of the rotary brushes, while the conveyor belt 9 traveling in opposite direction ensures that jumping products are slowed and rebound to the brushes, so that the residence time in the apparatus and the contact time with the brushes yield the desired treatment effect.

In addition to being influenced by the speed of the conveyor belt 9, the height of the treatment channel and the stiffness of the bristles 19, the treatment of the products can further be influenced by the inclination at which the housing 1 is arranged. This inclination can be modified with the aid of the long upright 8 by sliding the telescopic parts 8a and 8b apart.

It goes without saying that within the framework of the invention as laid down in the appended claims, many modifications and variations are possible. For instance, the rollers can be covered with other profiled treatment means and profiles than bristles. It is also possible to replace the housing portion 1a with a still further roller. Although technically less attractive, it would also be possible to mount the rollers in a movable frame for the purpose of modifying the channel height. If desired, the conveyor belt 9 too can be provided with treatment means or profiles. Also, a variety of other adjusting means than the depicted jacking means with spindles are possible. All these adjusting means can, if desired, be motor-operated and electronically controlled.

What is claimed is:

1. An apparatus for treating the surface of bulbous or tuberous crops, comprising: a substantially tubular treatment channel having a longitudinal main transport direction and a height direction and inclining upwardly in the longitudinal main transport direction and bounded at a bottom portion thereof by a plurality of drivable rollers arranged with spaces therebetween and parallel to each other and transverse to the longitudinal main transport direction and having treatment elements at the circumferences thereof, and bounded at a top portion thereof by a lower portion of a drivable endless conveyor belt traveling around pulleys; and wherein the conveyor belt and the rollers are movable relative to each other to modify a height of the treatment channel and are movable relative to each other in the longitudinal main transport direction such that when there is an increase in height of the treatment channel, the conveyor belt is movable with respect to the rollers in the longitudinal main transport direction and when there is a decrease in height of the treatment channel, the conveyor belt is movable with respect to the rollers in a direction opposite to the longitudinal main transport direction.

2. The apparatus according to claim 1, wherein a modification of the height of the treatment channel also results in a displacement of the relative positions of the conveyor belt and rollers in the longitudinal main transport direction.

3. The apparatus according to claim 1, wherein the rollers are stationary and the conveyor belt has an adjusting mechanism for movement thereof simultaneously in the longitudinal main transport and the height directions of the treatment channel.

4. The apparatus according to claim 3, wherein the adjusting mechanism has jacks mounted at an angle with the main longitudinal transport direction.

5. The apparatus according to claim 1, wherein the plurality of rollers includes a first roller disposed upstream of the conveyor belt and wherein at least a portion of an upper portion of the conveyor belt and a housing wall form a feed channel feeding crops onto the first roller, said housing wall having a first part parallel to said portion of the upper portion of the conveyor belt and a second part enclosing a steep angle with the longitudinal main transport direction of the treatment channel and placed between said first part and said first roller.

6. The apparatus according to claim 5, wherein substantially all of the rollers have axes lying in a common plane and at least the first roller has an axis that lies above the common plane towards the conveyor belt to form a receptacle for crops.

7. The apparatus according to claim 6, wherein the axes of the first two rollers lie above the common plane, with the axis of the first roller being farther away from the common plane than the axis of the second roller.

8. The apparatus according to claim 6, wherein the axis of the second roller is in a plane below a plane formed by the axes of the first and third rollers.

* * * * *